(12) United States Patent  (10) Patent No.: US 8,154,145 B2
Krauss  (45) Date of Patent: Apr. 10, 2012

(54) FLOW ENERGY INSTALLATION (76) Inventor: Gunter Krauss, Plauen (DE)

( * ) Notice: Subject to any disclaimer, the term of this patent is extended or adjusted under 35 U.S.C. 154(b) by 613 days.

(21) Appl. No.: 12/220,818

(22) Filed: Jul. 29, 2008

(65) Prior Publication Data

US 2009/0045632 A1 Feb. 19, 2009

(30) Foreign Application Priority Data

Aug. 10, 2007 (WO) ................ PCT/DE2007/001432

(51) Int. Cl.
    *F03B 17/00* (2006.01)
(52) U.S. Cl. ............... 290/54; 290/44; 415/4.2; 415/4.4
(58) Field of Classification Search ................... 415/4.2, 415/4.4, 3.1; 290/43–44, 53–54; 60/398, 60/641.7, 698
See application file for complete search history.

(56) References Cited

U.S. PATENT DOCUMENTS

| | | | |
|---|---|---|---|
| 3,922,012 A * | 11/1975 | Herz | 290/43 |
| 4,084,918 A | 4/1978 | Pavlecka | |
| 4,350,900 A | 9/1982 | Baughman | |
| 6,666,650 B1 * | 12/2003 | Themel | 416/200 R |
| 7,573,148 B2 * | 8/2009 | Nica | 290/55 |
| 2002/0109358 A1 | 8/2002 | Roberts | |
| 2003/0025334 A1* | 2/2003 | McDavid, Jr. | 290/54 |
| 2004/0036297 A1 | 2/2004 | John | |
| 2004/0061337 A1* | 4/2004 | Becker | 290/44 |
| 2006/0198724 A1* | 9/2006 | Bertony | 415/4.4 |
| 2006/0275105 A1* | 12/2006 | Roberts et al. | 415/4.2 |
| 2008/0231057 A1* | 9/2008 | Zeuner | 290/54 |

FOREIGN PATENT DOCUMENTS

| | | |
|---|---|---|
| DE | 2535138 | 2/1976 |
| DE | 2451751 | 5/1976 |
| DE | G 83 04 792.1 | 5/1983 |
| DE | G 85 33 984.4 | 3/1986 |
| DE | G 86 31 273.1 | 5/1987 |
| DE | 199 20 560 | 8/1999 |
| DE | 299 07 940 | 9/1999 |
| DE | 299 20 899 | 4/2000 |
| DE | 299 80 074 | 7/2000 |
| DE | 199 57 141 | 5/2001 |
| DE | 201 08 925 | 10/2002 |
| DE | 101 25 938 | 2/2003 |
| DE | 20 2006 013 779 | 2/2008 |
| DE | 202008010395 | 11/2008 |
| DE | 10 2009 035 997 | 5/2010 |

(Continued)

OTHER PUBLICATIONS

"Hydroheizung" by R&S Windenergy GmbH & Co. KG.

*Primary Examiner* — Michael Zarroli
(74) *Attorney, Agent, or Firm* — Horst M. Kasper (57) ABSTRACT

A flow energy installation with a roller-like rotor (1) is presented. The roller-like rotor (1) rotates about an axis (A1) and has a plurality of rotor blades (2). One of the rotor blades (2), a plurality of the rotor blades (2) or all rotor blades (2) have associated with themselves at least one efficiency-improving fluid conducting fin (3) which in the direction of rotation is arranged upstream or downstream of the rotor blade (2). The rotor (1) is at least partly surrounded by at least one efficiency-improving diffuser element. The flow energy installation can be operated with liquid and/or gaseous media at any desired orientation of the axis (A1).

51 Claims, 10 Drawing Sheets

FOREIGN PATENT DOCUMENTS

| | | |
|---|---|---|
| EP | 0 957 265 | 11/1999 |
| EP | 11 77 381 | 2/2002 |
| EP | 138 6586 | 2/2004 |
| EP | 175 2070 | 2/2007 |
| FR | 2 286 954 | 4/1976 |
| WO | WO81/00436 | 2/1981 |
| WO | WO 91/19093 | 12/1991 |
| WO | WO 02/095221 | 11/2002 |
| WO | WO2004/092578 | 10/2004 |
| WO | WO 2008/028675 | 3/2008 |

* cited by examiner

FLOW ENERGY INSTALLATION

The invention relates to a flow energy installation, in particular wind power installation, having at least one rotor which rotates about an axis and has rotor blades.

DE 810 500 B has already described a wind turbine with fins which are rotatable about a vertical axis, which wind turbine is arranged in a guide housing which has a slightly tapering inlet channel. Arranged centrally in the direction of approach flow is a shielding body which, however, has a disadvantageous effect in terms of flow.

DE 85 33 964 U1 describes a horizontally acting wind fin motor which has a wind funnel which partly surrounds the wind fins and can be brought into the required wind direction via a wind vane. The wind funnel is configured in the form of a quarter circle in cross section. DE 198 56 914 A1 describes a vertical wind rotor with an air intake surface configured on an arm and an installation with a straight plate-like wind-dividing metal sheet is proposed in DE 86 31 273.1. All three aforementioned solutions are configured disadvantageously in terms of flow.

DE 299 20 899 U1 discloses a wind power installation with a vertical rotor and frontal approach flow, with which funneling-in or suction is to be achieved by way of a specific inlet surface construction, thus allowing higher throughflow speeds to be achieved. Orientation corresponding to the direction of approach flow of the wind is to be achieved by way of a specific construction of two inlet surfaces (diffuser surfaces). It has however been found that the desired tracking could not always be observed.

DE 201 02 051 U1 discloses a wind power installation with vertical rotors which flow approaches from the front and the approach flow region of which is provided in a complex manner with funnel-like inlet and covering metal sheets. A total of three vertical rotors are provided in this wind power installation. The flow resistance of this installation is increased in particular by way of the centrally arranged baffle plates.

The solution described in DE 20 2006 008 289 U1 is intended to provide a wind power installation which is independent of the wind direction. Provided for this purpose are six large and six small inlet surfaces between which is arranged a rotor which rotates anticlockwise and has three aerodynamically shaped fins.

All of the aforementioned solutions have the drawback that their efficiency is too low and that they can generally be used as wind power installations only with vertically oriented rotor axes.

The object of the invention is to provide a flow energy installation in which the energy, in particular the kinetic energy of a flowing medium can be converted with high efficiency into other forms of energy and which can be operated with gaseous or liquid media.

The object is achieved by the features of the first claim. Advantageous configurations emerge from the sub-claims.

The flow energy installation according to the invention has at least one roller-like rotor which rotates about an axis and has a plurality of rotor blades, wherein
one, a plurality or all rotor blades have associated with them at least one efficiency-improving air conducting fin which is arranged upstream or downstream of the rotor blade in the direction of rotation
and/or
the rotor is at least partly surrounded by at least one efficiency-improving diffuser element,
and wherein the flow energy installation can be operated with liquid or gaseous media at any desired orientation of the axis of the rotor.

This novel innovative configuration of the new-generation flow energy installation allows the flow energy installation to be put to a broad range of uses. In particular, the use with gaseous media, i.e. the use as a wind power installation or the use in liquid media, for example as a turbine in dams or courses of rivers or as a water wheel having one and the same design opens up new possibilities and ensures cost-effective large-scale production.

Tests have revealed that in particular as a result of the novel "double fin principle", an outstanding improvement in efficiency of approx. 30% may be observed.

Preferably, each air conducting fin is arranged set apart from the rotor blade in the direction of rotation. In this case, the radially outer front of the rotor blade and the radially outer front of the air conducting fin are arranged offset from each other by an angle.

Furthermore, it is advantageous if the distance of the air conducting fin from the rotor blade increases radially inward.

The length of the air conducting fin can be smaller than the length of the rotor blade or else correspond to the length of the rotor blade.

The rotor blade and/or the air conducting fin are configured so as to be airfoil-like (aerodynamic) in cross section.

The roller-like rotor has rotor blades which extend in the axial direction of the axis extending or wind helically about the axis of rotation of the rotor, the respective leading surface of said rotor blades being curved concavely in the wind direction and the trailing surface thereof being curved convexly. Each rotor fin has a radially outer outside edge and a radially inner inside edge extending substantially in the axial direction. The air conducting fins also extend in the axial direction of the axis and are modeled substantially on the nature of the streamlined configuration of the rotor fins; only the radial extension of the air conducting fins and the thickness thereof can be less than the radial extension and the thickness of the rotor fins. The diffuser element is arranged at a defined distance from the rotor in accordance with the "double decker principle". The diffuser element is preferably configured as a hollow sheath body or it consists of a basic element which is encased by a sheath body. The basic element consists in this case in particular of interconnected frame-like/plate-like elements which correspond in their outer contour formed on the circumferential side to the outer contour to be produced of the respective diffuser element. The frame-like/plate-like elements are preferably made of plastics material, fibre-reinforced plastics material, glass fibre-reinforced plastics material, metallic material, wood or combinations of the aforementioned materials and are joined together by means of struts. The struts can also be made of plastics material, fibre-reinforced plastics material, glass fibre-reinforced plastics material, metallic material, wood or combinations of the aforementioned materials. The frame-like/plate-like elements and/or the struts have rounded contours in the direction toward the sheath body, to avoid damage to the sheath body, in particular if said sheath body is made of a thin membrane material or film material, woven fabric or of fabric or thin-walled plastics material. Furthermore, the sheath body can be made of metallic material (sheet metal) or combinations of the aforementioned materials and have a single-layered or multilayered construction.

Furthermore, it is possible to fill out the gaps present in the basic element as a result of the frame-like construction, for example with foam, structural foam, rigid foam, granular or flocculent material.

Furthermore, it is possible to make the diffuser element so as to be solid, for example of foamed or cast material.

The diffuser element(s) are in particular streamlined in their configuration and arched in certain regions in the direction toward the rotor in such a way that they are adapted to the course of a circular envelope spanning the outwardly pointing ends of the rotor blades. Preferably, a diffuser element is arranged on both sides for each rotor on two opposing longitudinal sides of the rotor, so that for each rotor an inflow opening and an outflow opening are formed, the diffuser elements being configured so as to be airfoil-like in cross section. The diffuser elements extend between a first closure plate and a second closure plate, the first closure plate and/or the second closure plate being outwardly arched. At least one rotor is rotatably mounted between the first closure plate and the second closure plate. Two or more motors can also be arranged next to one another and/or one above another between the first closure plate and the second closure plate in the direction of flow. The rotor has at least two outer rotor plates between which the rotor blades extend. One or more third rotor plates, stabilising the rotor blades, can be arranged between the two outer rotor plates. The rotor plates are preferably circular in their configuration.

The rotor has on the circumferential side a plurality of rotor blades arranged next to one another. Furthermore, rotor blades can also be combined one above another or next to one another (depending on the orientation at the axis of rotation) in a "double-storey" or "multistorey" design. These rotor blades, arranged one above another/next to one another, of the rotor can be aligned with one another or offset from one another in the circumferential direction.

The outer contour of the sheath body of the diffuser element or the outer contour of the solid diffuser element has in the direction of approach flow of the wind edges which form an inflow opening and in the direction of away flow edges which form an outflow opening.

Starting from the direction of approach flow of the wind, the distance between the mutually facing surfaces of the sheath body of the diffuser element(s) tapers, is subsequently adapted to the course/diameter of the rotor and widens again after the rotor. The outwardly pointing surfaces of the sheath body of the diffuser elements are preferably configured so as to form mirror images of each other.

The surface of the sheath body of the diffuser element running from the edge to the rotor preferably has a concave-convex curvature.

The convex curvature of a rotor blade and the convex curvature of an air conducting fin point in particular in the direction of rotation.

The energy provided by the flow energy installation can be used via a generator to generate power or can also be used directly to charge a battery.

Furthermore, it is possible to use the rotation of the installation to produce warm water.

The flow energy installation is preferably designed so as to be able to pivot in any desired direction. This allows the installation to be used both as a wind power installation and as a turbine in liquid media (courses of rivers, dams) with a vertically or horizontally oriented first axis of the rotor.

On use in flowing media, in particular rivers or canals, a flow energy installation can be fastened in the floor region of the waterway with a vertical axis (A1), so that the installation operates independently of the water level, as even at a low level a portion of the installation is still flowed through.

If the axis of the flow energy installation is horizontally mounted, it is possible to secure the installation in a "floating" manner in the waterway, so that the installation rises or falls with the level and can also be operated independently of the water level.

If the flow energy installation is used as a wind power installation, adjustability of the diffuser in accordance with the wind direction is advantageous, so that the approach flow opening always points or is oriented in the wind direction.

This can for example be achieved by means of a vane-like arrangement on the wind power installation. This is a simple and trouble-free possibility for automatic orientation of the diffuser housing.

The wind power installation has at least one rotor which rotates about a first vertical axis and has a plurality of rotor blades, wherein according to the invention each rotor blade has associated with it at least one air conducting fin which is arranged upstream of the rotor in the direction of rotation.

In accordance with the length of the rotor, the diffuser elements extend on one or both sides thereof. On use of two diffuser elements, the diffuser elements form in the direction of approach flow of the wind before the rotor an inflow opening and after the rotor an outflow opening. In the direction of approach flow of the wind, the inflow opening tapers in this case to a width corresponding to approx. 50% of the diameter of the rotor. The outflow opening widens relative thereto after the rotor to approx. twice the diameter of the rotor. The diffuser elements are fastened to the base plate on which the rotator is also rotatably mounted. The closure plate is, in the case of a vertical direction of the axis, mounted for example to a mast so as to be able to pivot about a second axis. As the diffuser elements are connected to the base plate and the rotor is arranged between the base plate and the cover plate, these jointly perform the pivoting movement about the vertical second axis. The axes of the base plate and of the rotor are in alignment or set apart from each other, thus ensuring better tracking of the installation as a function of the wind direction.

It is possible to use one or two diffuser elements. Preferably, one diffuser element is arched radially outward in such a way that it is adapted to the course of a circular envelope spanning the outwardly pointing ends of the rotor blades. The inner radius of curvature of the diffuser element is in this case selected in accordance with the desired distance from the rotor blades. The length of the diffuser element should correspond approximately to the distance of the outwardly pointing edges of two rotor blades. The swiveling movement of the diffuser element can, as described hereinbefore, be controlled for example as a function of a wind vane which can be rotated by the wind. It is however also possible for the diffuser element to be adjusted at an actual pivot axis, set apart from the rotor axis, in accordance with the wind direction. The height of the diffuser element should correspond roughly to the height of the rotor.

It is furthermore possible to use the flow energy installation according to the invention in land, air and water vehicles, depending on the field of use, in conjunction with corresponding power take-offs and converters to generate energy from the wind or head wind and/or from flowing liquid media.

For example, the installation can be integrated in cars or large goods vehicles into the front in the region of the radiator grille. This is carried out preferably with a horizontally oriented axis of rotation of the rotor. The wind power installation can then for example be used in conjunction with a generator to charge a battery which is in turn used to drive the vehicle.

The flow energy installation can however also be operated in combination with hydraulic and/or pneumatic and/or other electrical systems or in combination with an internal combustion engine in the manner of a hybrid system.

Furthermore, it is possible to use the installation in space travel.

As a result of the arrangement of one or two of the diffuser elements at a relatively short distance from the rotor blades and the funnel-shaped widening in and counter to the wind direction, via which the flow tangentially approaches diffuser elements, in conjunction with the use of the air conducting fins, it is possible to observe a surprisingly strong suction effect and a reduced pressure in the direction of away flow of the wind, resulting in a marked increase in the throughflow speed and thus the rotational speed of the rotor. This can allow the output of the wind power installation to be increased by approx. 30%.

The invention will be described hereinafter with reference to exemplary embodiments and associated drawings, in which.

Figure 1:
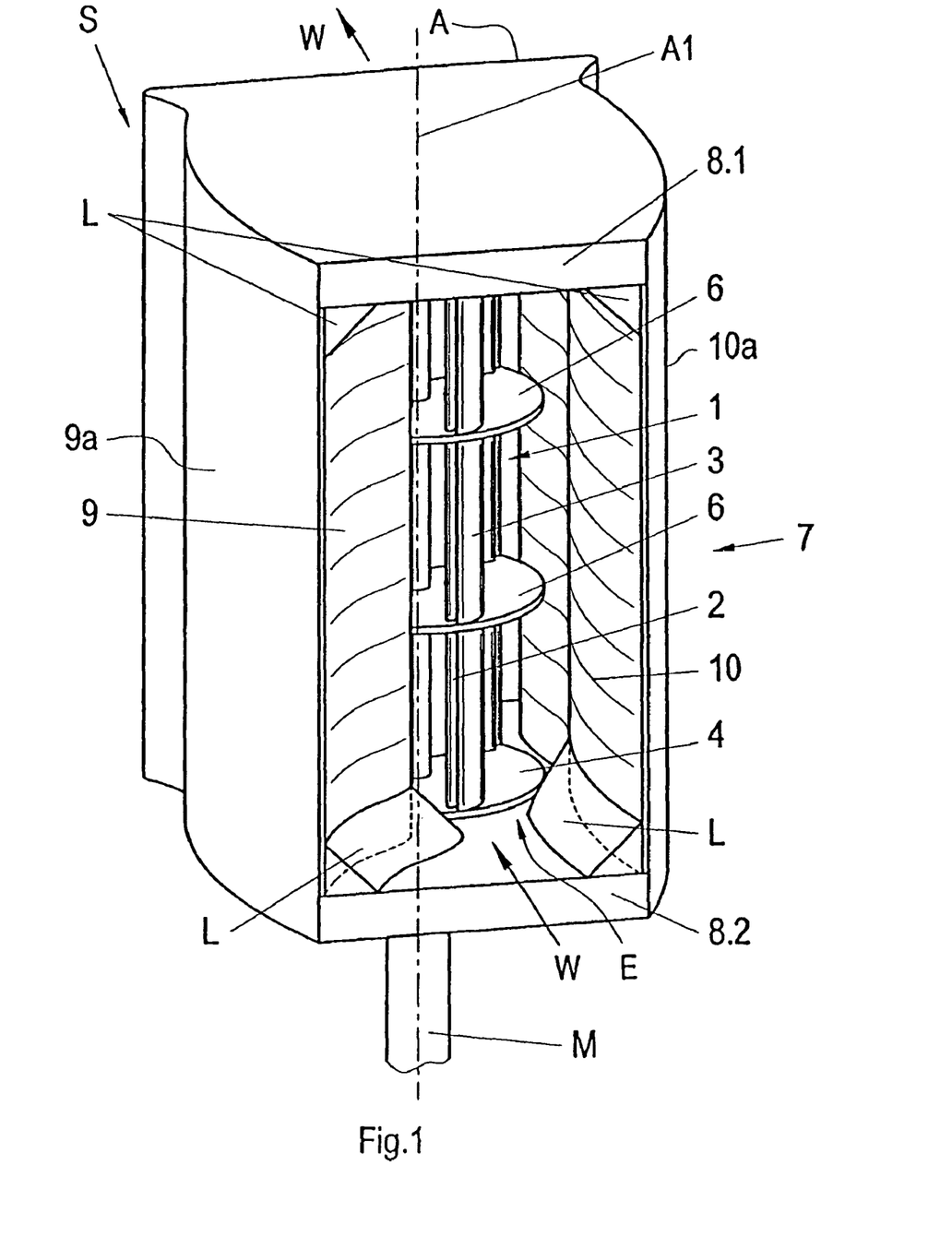
FIG. 1: is a three-dimensional view of a wind power installation from the direction of approach flow.
Figure 2:
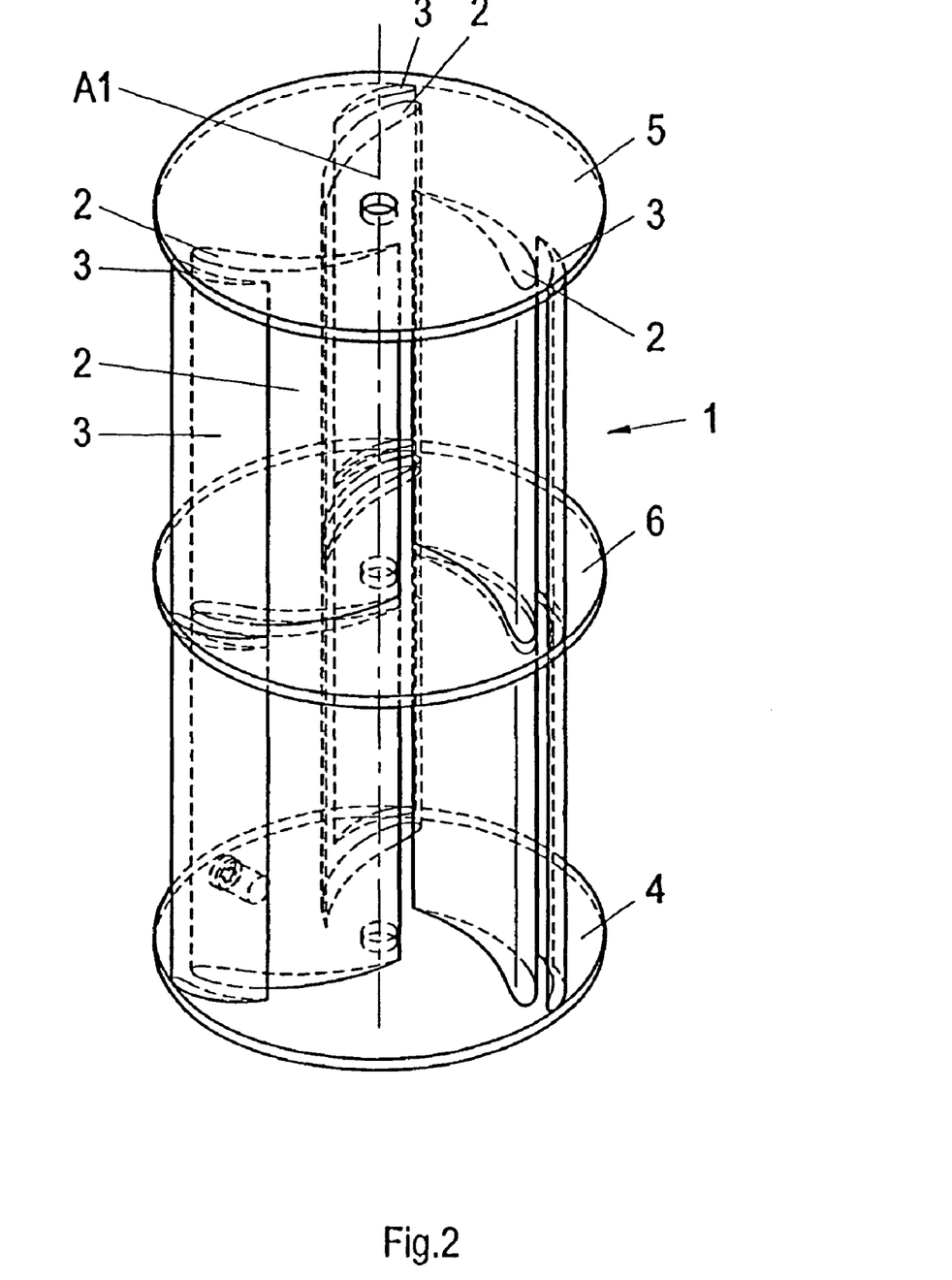
FIG. 2: is a three-dimensional view of just the rotor.
Figure 3:
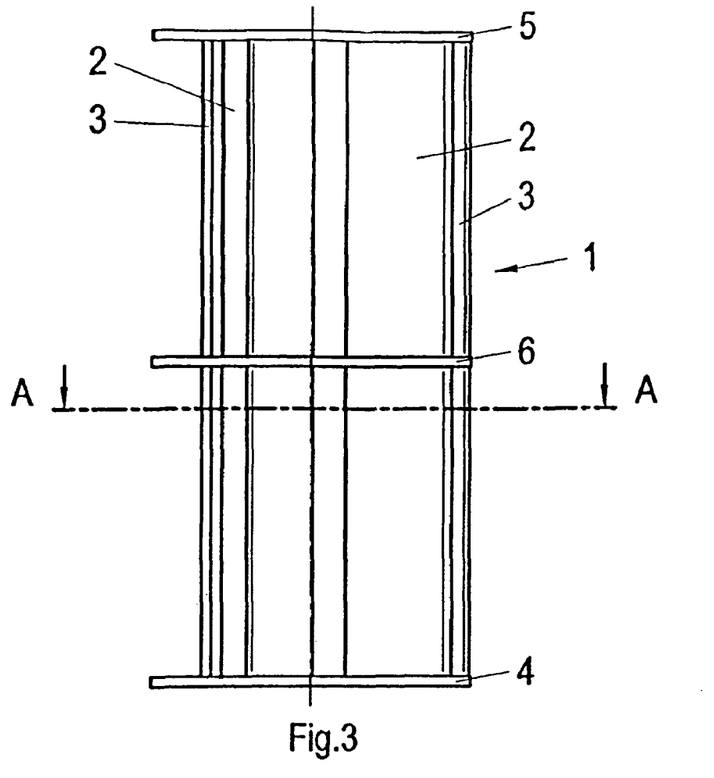
FIG. 3: is a side view of the rotor.
Figure 4:
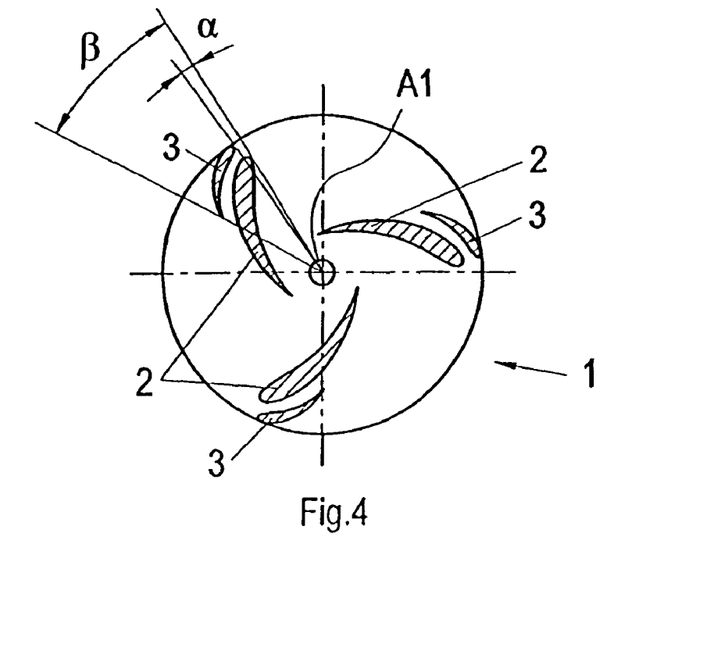
FIG. 4: shows section A-A according to FIG. 3.

FIG. 1 is a three-dimensional view from the direction of approach flow of a flow energy installation during use as a wind power installation with a roller-like rotor 1 which is able to rotate about a first vertical axis A1 (see FIG. 2 to 4). The rotor 1 has three vertically extending rotor blades 2, an air conducting fin 3 being arranged upstream of each rotor blade 2 in the direction of rotation. The rotor 1 is delimited by an in this case downwardly closed first rotor plate 4 and an upwardly closed second rotor plate 5. Between these outer rotor plates 4, 5, the rotor 1 is stabilised by two stabilising rotor plates (see FIG. 1) or by only one (see FIG. 2) stabilising rotor plate 6. The rotor blades 2 and the air conducting fins 3 can be configured in one piece, i.e. continuous from start to end and penetrating the stabilising rotor plates, or be configured in a plurality of pieces.

The air conducting fins 3 are set apart from the rotor blades 2, it being clear from the plan view according to FIG. 4 that starting from the first axis A1, the radially outer front of the rotor blades 2 is offset at an angle α compared to the radially outer front of the air conducting fins 3. An angle β is formed between the radially outer front of the rotor blades 2 and the radially inner end of the air conducting fins 3. The air conducting fin 3 causes the air flow of the rotor blade 2 to be maintained for longer, thus allowing the efficiency of the installation to be significantly increased. The "double vane" formed from the rotor blade 2 and air conducting element 3 thus significantly increases the output of the installation. The directions of curvature of the rotor blade 2 and air conducting element 3 are in this case preferably configured in the same direction.

The rotor 1 is partly encased by a body (see FIG. 1) 7 which sits pivotably on a mast M. The body 7 consists of an upper first closure plate 8.1 and a lower second closure plate 8.2. A first diffuser element 9 and a second diffuser element 10 extend between the closure plates 8.1, 8.2 on both sides of the rotor 1. The rotor 1 is covered by the first diffuser element 9 in the direction of approach flow over up to approx. 50% of its diameter, so flow approaches the rotor 1 over just approx. 50% of its width. Formed in the direction of approach flow of the wind W between the two diffuser elements 9, 10 before the rotor 1 is an inflow opening E and, in opposition thereto, after the rotor 1 an outflow opening A. The perpendicular outer surfaces 9.a and 10.a of the first and second diffuser elements 9, 10 are configured so as to form mirror images of each other and are between the inflow opening E and the outflow opening A first curved convexly in a large curvature arc and then curved concavely in a smaller curvature arc.

From the upper closure plate 8.1 and from the lower closure plate 8.2 there extend to the first and to the second diffuser element 9, 10 baffle plates L which have a bevel of approx. 45° and by means of which turbulences are avoided or reduced.

Figure 5A:
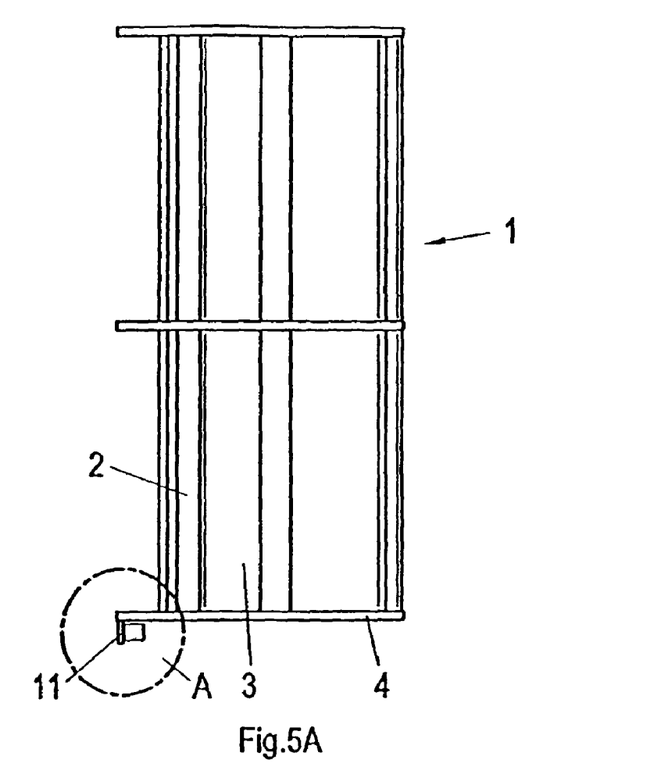
FIG. 5: is a side view of a rotor with a hydraulic motor (top), an enlarged view of the hydraulic motor (bottom left) and an enlarged front view.
Figure 5B:
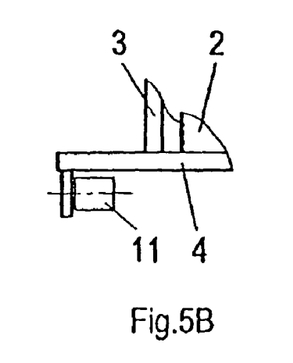
Figure 5C:
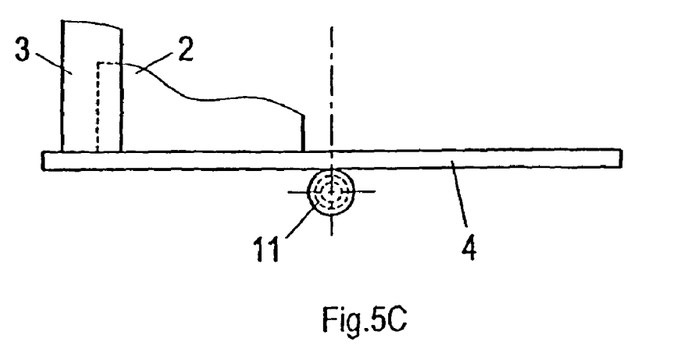

FIG. 5 shows the rotor 1, wherein it may be seen that there sits below the first rotor plate 4 a drive 11 which accelerates the rotor and is secured to the outer diameter of the mast. This can for example be used at low wind speeds to facilitate the start-up of the rotor.

Figure 6:
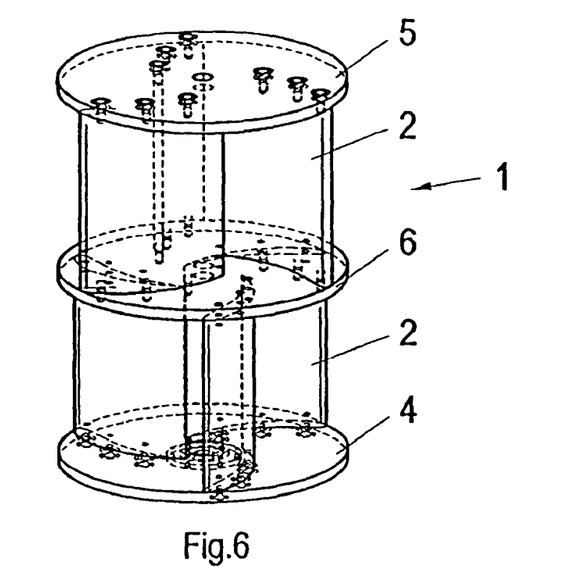
FIG. 6: is a three-dimensional view of a rotor with rotor fins arranged one above another and offset from one another.
Figure 7:
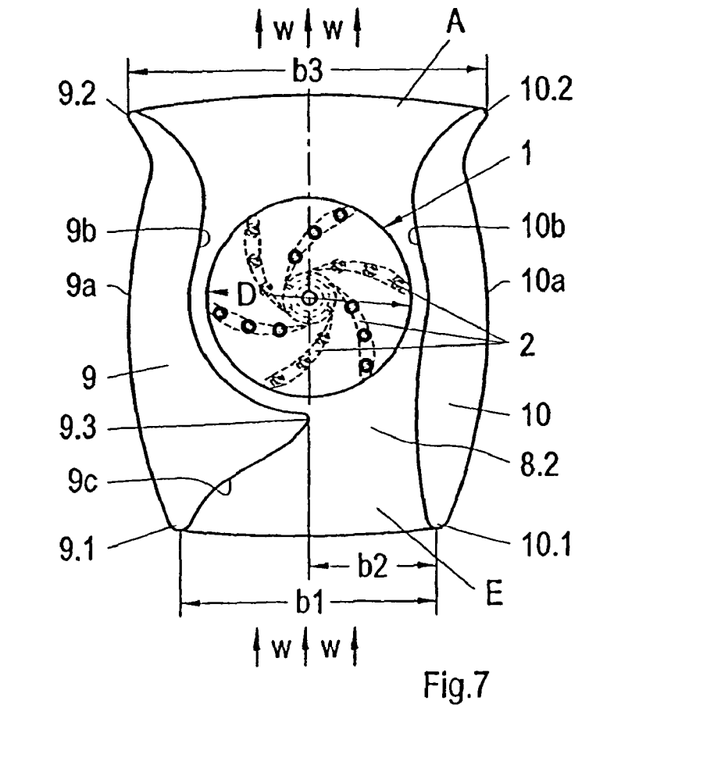
FIG. 7: is a plan view according to FIG. 6 with diffuser elements.

FIG. 6 is a three-dimensional view of a rotor 1 with rotor blades 2 arranged one above another and offset from one another (without the use of air conducting fins). The rotor blades 2 arranged between the first rotor plate 4 and the third rotor plate 6 are arranged offset from the rotor vanes arranged between the second rotor plate 5 and the third rotor plate 6, so that in each case an upper rotor blade 2 lies substantially centrally in the plan view (see FIG. 7) between two lower rotor blades 2. FIG. 7 is a schematic plan view of the rotor 1 according to FIG. 6, the rotor 1 being partly encased in this case by the first and the second diffuser element 9, 10. The upper closure plate has not been shown in this case.

This view according to FIG. 7 again shows the inflow opening E oriented in the direction of approach flow of the wind W and the outflow opening A. The first diffuser element 9 covers in this case approximately 50% of the rotor 1 in the direction of approach flow, wherein lower coverage can also be provided. Also provided are on the first diffuser element 9, laterally of the inflow opening, a rounded edge 9.1 and on the second diffuser element 10 a rounded edge 10.1. The two edges 9.1, 10.1 project radially outward beyond the outer diameter of the rotor 1 in the direction of approach flow. The distance b1 between the two edges 9.1, 10.1 corresponds roughly to the rotor diameter D or is somewhat larger than the rotor diameter D. The first diffuser element 9 has in the outflow direction A a further rounded edge 9.2. Provided on the first diffuser element 9 just a short distance from the rotor 1 is a third rounded edge 9.3 which in this case covers approximately 50% of the rotor 1. The second diffuser element 10 also has a rounded edge 10.2 in the direction toward the outflow opening.

There extend between the first edge 9.1 and the second edge 9.2 the perpendicular outer surfaces 9a of the first diffuser element 9, between the second edge 9.2 and the third edge 9.3 a diffuser surface 9b and between the first edge 9.1 and the third edge 9.3 a diffuser surface 9c. The diffuser surface 9b runs from the edge 9.2 first in a convex arch which is adjoined, following the course of the rotor 1, by a concave curvature up to the edge 9.3. The diffuser surface 9c has from the edge 9.1 up to the edge 9.3 first a concave and then a convex curvature. The second diffuser element 10 has the edge 10.2 in the direction toward the wind outlet. Between the edge 10.1 and the edge 10.2, the second diffuser element 10 has outwardly a perpendicular outer surface 10a and in the direction toward the rotor 1 a diffuser surface 10b. The course of the diffuser surface 10a is configured so as to form a mirror image of the surface 9a. The surface 10b runs up to the rotor 1 in a convex curvature which is adjoined by a concave curvature from which the surface 10b runs in a convexly curved arc up to the edge 10.2. Viewed roughly from the centre line of the rotor 1 in the direction toward the outflow opening A, the surfaces 9b and 10b have in mirror-inverted form substantially the same course. The distance b2, delimiting the inflow opening E, between the edge 9.3 and the surface 10b is at least approximately 0.5×D. The distance b3, forming the outflow opening A, between the edges 9.2 and 10.2 is preferably approximately 1D to 2D.

The rotor blades 2 are according to FIG. 1 to 7 configured so as to be airfoil-like in cross section and extend radially inward from the outer circumference in an arched or curved form. The convexly curved surface of the rotor blades 2 points in the direction of rotation; flow approaches the concavely curved surface of the rotor blades 2.

The inner longitudinal edges of the rotor blades 2 point toward the concave surface of the next rotor blade 2. If present, the air conducting fins 3 are curved and oriented similarly to the rotor blade.

Figure 8:
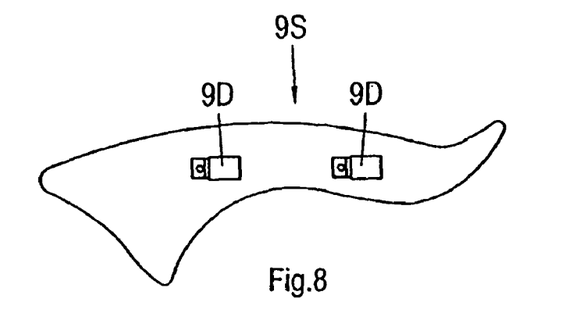
FIG. 8: is a view of a first frame-like/plate-like element for the first diffuser element.

FIG. 8 is a view of a first frame-like/plate-like element 9S for the first diffuser element 9. The first element 9S has two apertures 9D used to fasten said first element. The outer contour of the first element 9S corresponds to the circumferential contour to be produced of the first diffuser element, for example according to FIG. 1 or 7.

Figure 9:
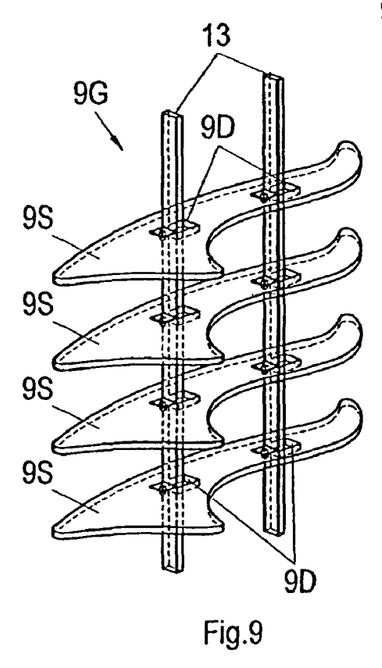
FIG. 9: is a view of the first basic element of the first diffuser element.
Figure 10:
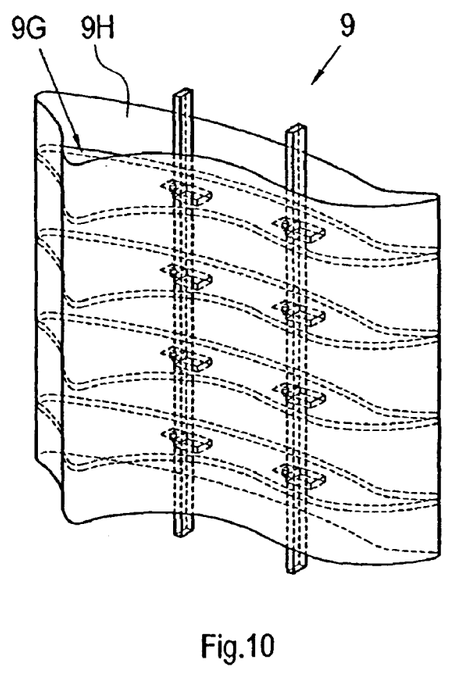
FIG. 10: shows the first diffuser.
Figure 11:
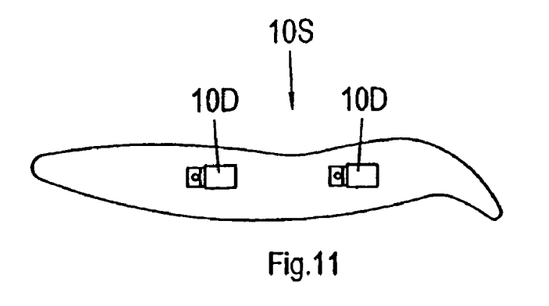
FIG. 11: is a view of a second frame-like/plate-like element for the second diffuser.

FIG. 9 shows the first basic element 9G of the first diffuser element 9. A plurality of frame-like/plate-like elements 9S were fastened to struts 13 which protrude through the apertures 9D, set apart from one another, using suitable fastening means (not shown). This basic element 9G is subsequently encased with the sheath body 9H and the first diffuser element 9 thus formed. The second diffuser element is similarly constructed. The second frame-like/plate-like element 10S for the second diffuser element 10 is shown in FIG. 11. It also has two apertures 10D used to fasten said second element. The outer contour of the second element 10S corresponds to the circumferential contour to be produced of the second diffuser element 10, for example also according to FIG. 1 or 7.

Figure 12:
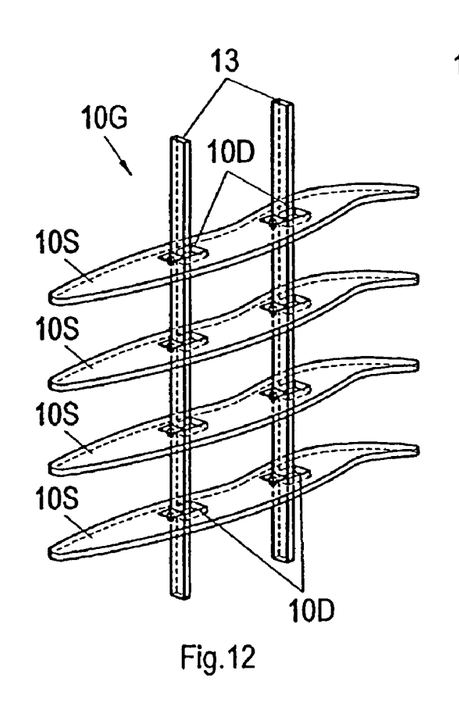
FIG. 12: is a view of the second basic element of the second diffuser.
Figure 13:
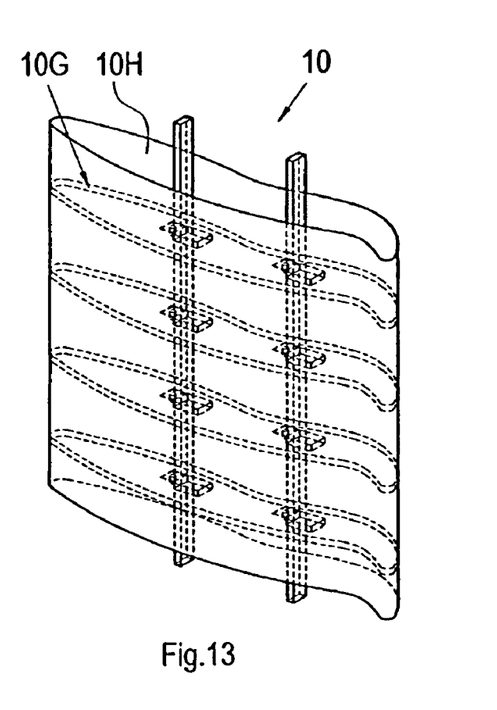
FIG. 13: shows the second diffuser.

According to FIG. 12, the second basic element 10G of the second diffuser element 10 was produced from a plurality of frame-like/plate-like second elements 10S by means of struts 13 which protrude through the apertures 10D. The basic element 10G is subsequently also encased with a sheath body 10H, thus producing the second diffuser element 10.

Figure 14:
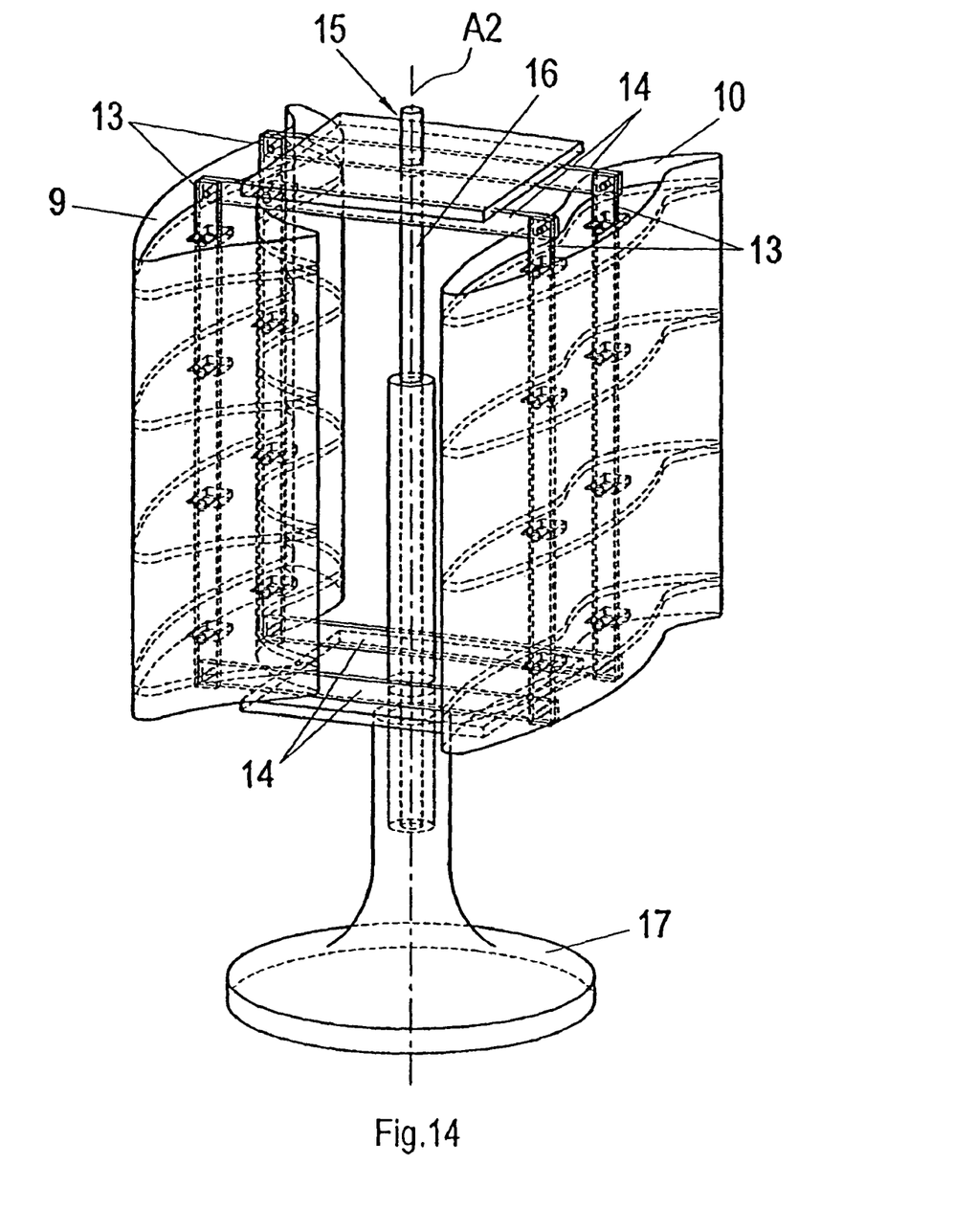
FIG. 14: is a schematic view of the coupling of the first diffuser and second diffuser.

Now, both diffuser elements 9, 10 according to FIG. 14 are joined together by means of cross struts 14, which bind to the upper and lower ends of the struts 13, by means of fastening elements (not shown). In this case, the inner cross struts 14 substantially intersect the second axis A2 about which the diffuser elements 9, 10 are to be able to pivot and carry the bearings of the diffuser elements. The corresponding bearing 15 sits at the top on a shaft 16 which in this case can be fastened, for example to a mast (not shown here), via a base plate 17.

Figure 15:
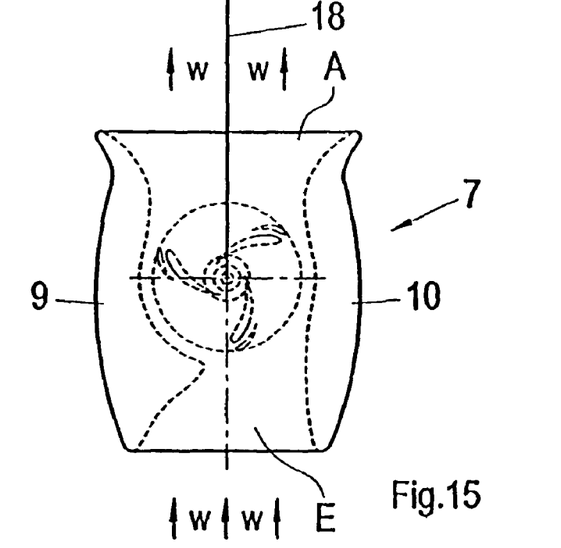
FIG. 15: is a plan view of a wind power installation with a wind vane.
Figure 16:
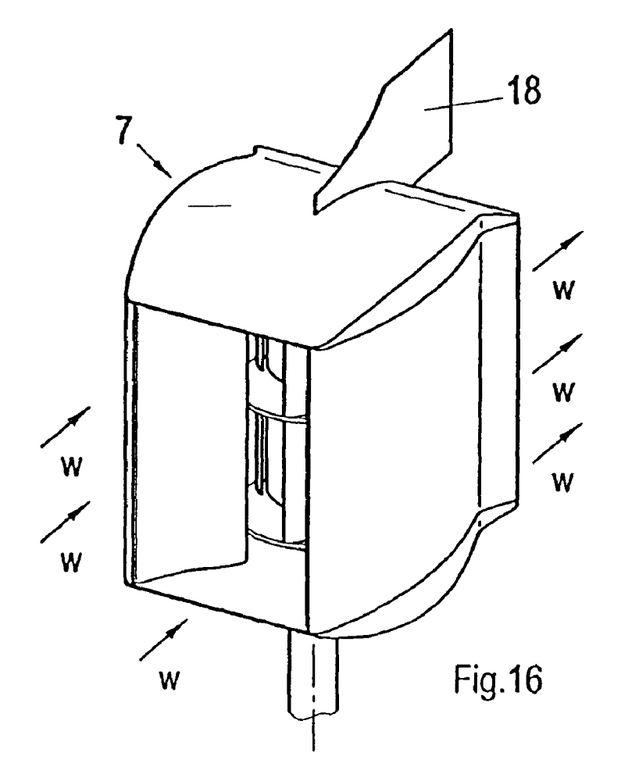
FIG. 16: is three-dimensional view from the direction of approach flow according to FIG. 15.

FIGS. 15 and 16 show a simple possibility for adjusting the body 7 in accordance with the wind direction. In this case, a wind vane 18, which projects radially beyond the body 7 on the side of the outflow opening A, sits on the body 7.

Figure 17:
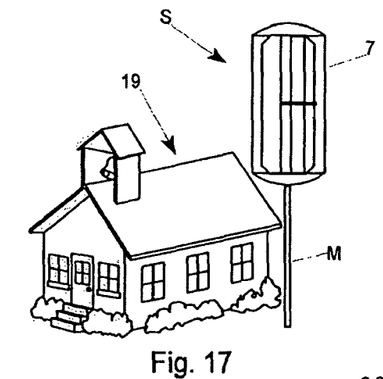
FIG. 17: shows the use of a vertical flow energy installation for supplying energy to a home.

FIG. 17 shows a vertical flow energy installation S as a wind power installation, with a body 7 arranged on a mast M, which installation is for example arranged next to a single-family house 19 and can supply said house with electricity and warm water.

Figure 18:
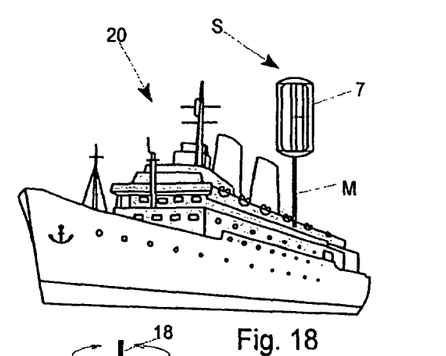
FIG. 18: shows the use of a vertical flow energy installation to generate power or to charge a battery on a ship.

FIG. 18 also shows a vertical wind power installation W on a ship 20, with which for example batteries can be recharged.

Figure 19:
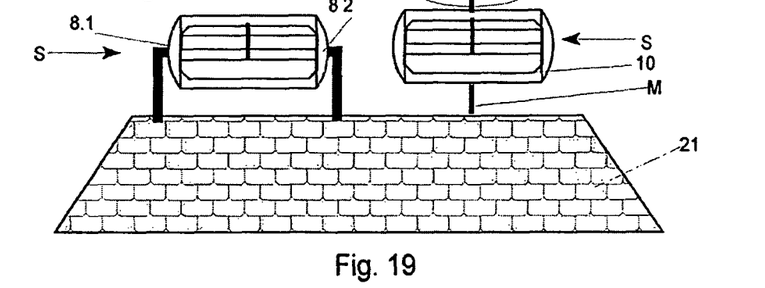
FIG. 19: shows the use of two horizontal flow energy installations on a roof for supplying energy to a home.

According to FIG. 19, it is also possible to arrange one or more horizontal flow energy installation(s) S on a roof 21. The body 7 is then for example received at its two closure plates 8.1, 8.1 (left-hand wind power installation) or is rotatably mounted on the diffuser element (in this case 10) pointing toward the roof 21, thus allowing said body to be oriented in accordance with the wind direction (right-hand wind power installation).

Figure 20:
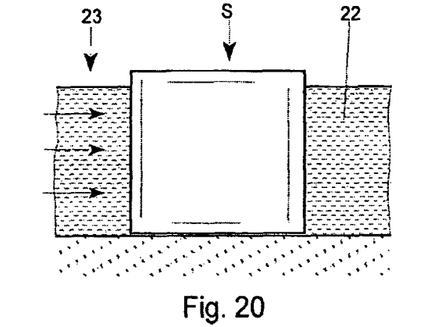
FIG. 20: is a side view of the use of a vertical flow energy installation to generate power in a course of a river or a canal.
Figure 21:
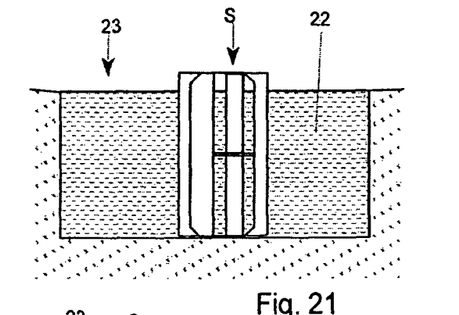
FIG. 21: is a front view according to FIG. 20.

FIG. 20 is a side view and FIG. 21 a front view of a vertical flow energy installation S for flowing media 22 to generate power in a canal 23. The flow energy installation S was secured to the base of the canal 23. Even when the water level falls, the installation is still driven.

Figure 22:
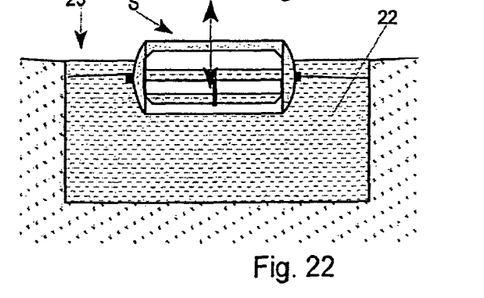
FIG. 22: is a front view of the use of a "floating" horizontal flow energy installation to generate power in the course of a river or a canal.

FIG. 22 is a schematic front view illustrating the use of a "floating" horizontal flow energy installation S to generate power. The flow energy installation S is also adapted, as a result of the floating fastening thereof, to the level of the flowing medium 22.

On use of the flow energy installation S in rivers or canals, the living area of the fish is not encroached upon, as the installation rotates in accordance with the flow of the water and does not produce any shearing effect. The fish can swim through the installation or else past the installation.

Figure 23:
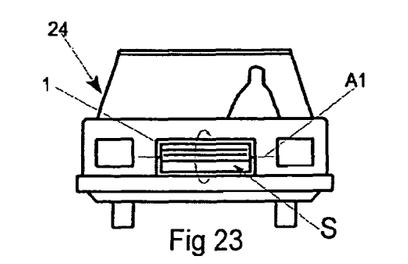
FIG. 23: is a view of a flow energy installation integrated into a car.

FIG. 23 is a view of a flow energy installation S integrated into a car 24. The flow energy installation S, which is configured as a wind turbine with a horizontal rotor axis A1, is integrated into the radiator grille 24 of the vehicle. The slender configuration of the wind turbine W allows said wind turbine to be optimally integrated therein. Generators (not shown), for example, can be connected to one or both sides of the rotor 1.

In all of the aforementioned examples according to FIG. 17 to 23, the energy generated by the flow energy installation S is converted into other forms of energy if required using suitable transmission (for example gear-wheel transmission, synchronous belt transmission), clutches, for example for compensating for relative movements between a drive shaft (in this case the shaft of the rotor) and an output shaft (for example the shaft of a generator) and corresponding converters.

With the aid of the transmission, for example the output of the rotor of the flow energy installation is converted in the form of a low rotational speed and a high torque into an output required for a generator, i.e. a high rotational speed and a lower torque.

The output provided as a result of the rotation of the rotor is forwarded by the transmission (not shown in the exemplary embodiments) to the corresponding take-off units (generator, pump, etc).

Furthermore, according to exemplary embodiments (not shown), the flow energy installation can be used to drive a pump.

The flow energy installation can be pivoted in any desired direction and can operate with horizontally or vertically oriented rotor axes. It is also possible to pivot the flow energy installation (symbolically within a notional spherical body) into any desired position.

The solution according to the invention can thus be used for a broad range of areas of application. As a result of the acceleration of the wind speed in the flow body (diffuser elements), in particular in combination with the air conducting elements, the energy yield can be increased by more than 5 times over conventional flow energy installations.

Conventional, in particular three-fin horizontal wind power installations can generate unacceptable acoustic and visual effects. The noise level is often above 35 dB, and this is felt to be a disturbance particularly at night time. Furthermore, the change between light and shadow and, in particular when the sun is shining, the "disco effect", when light is reflected non-uniformly from the blank surfaces of the rotor fins, can become unbearable in the long term.

These drawbacks do not occur with the wind power installation according to the invention, for the installation operates at a very low noise level which is almost at zero or which corresponds merely to the natural wind noise.

As a result of the use of the diffuser or the diffuser elements, a disturbing change between light and shadow does not occur. As a result, it is possible to erect the wind power installations even in proximity to residential areas.

The large outer surfaces 9a, 10a of the diffuser elements 9, 10 can be used as advertising media.

The invention claimed is:

1. Flow energy installation with at least one in particular roller-like rotor (1) which rotates
   about an axis (A1) and has a plurality of rotor blades (2), wherein
   one, a plurality or all rotor blades (2) have associated with them at least one efficiency-improving fluid conducting fin (3) which in the direction of rotation is arranged upstream or downstream of the rotor blade (2) and/or
   the rotor is at least partly surrounded by at least one efficiency-improving diffuser element,
   and wherein the flow energy installation can be operated with fluid media at any desired orientation of the axis (A1),
   wherein the diffuser element comprises interconnected frame-like/plate-like elements, wherein
   the frame-like/plate-like elements correspond in their outer contour formed on the circumferential side to an inner contour to be produced of the respective diffuser element.

2. Flow energy installation according to claim 1, characterised in that each air conducting fin (3) is arranged set apart from the rotor blade (2) in the direction of rotation.

3. Flow energy installation according to claim 1, characterised in that the radially outer front (2.1) of the rotor blade (2) and the radially outer front (3.1) of the air conducting fin (3) are arranged offset from each other by an angle ($\alpha$).

4. Flow energy installation according to claim 1, characterised in that the distance of the air conducting fin (3) from the rotor blade increases radially inward.

5. Flow energy installation according to claim 1, characterised in that the length of the air conducting fin (3) is smaller than the length of the rotor blade (2) or in that the length of the air conducting fin (3) corresponds to the length of the rotor blade (2).

6. Flow energy installation according to claim 1, characterised in that the rotor blade (2) and/or the air conducting fin (3) are configured so as to be airfoil-like in cross section.

7. Flow energy installation according to claim 1, characterised in that the rotor (2) has rotor blades (2) extending in the axial direction of the axis (A1).

8. Flow energy installation according to claim 1, characterised in that the air conducting fins (3) extend in the axial direction of the axis (A1).

9. Flow energy installation according to claim 1, characterised in that the diffuser element is arranged at a defined distance from the rotor (2).

10. Flow energy installation according to claim 1, characterised in that the diffuser element is configured as a hollow sheath body.

11. Flow energy installation according to claim 1, characterised in that each diffuser element consists of a basic element and in that the basic element is encased by the sheath body.

12. Flow energy installation according to claim 1, characterised in that a basic element comprises interconnected frame-like/plate-like elements.

13. Flow energy installation according to claim 1, characterised in that the frame- like/plate-like elements are made of plastics material, fibre-reinforced plastics material, glass fibre-reinforced plastics material, metallic material, wood or combinations of the aforementioned materials.

14. Flow energy installation according to claim 13, characterised in that the frame-like/plate-like elements are joined together by means of struts.

15. Flow energy installation according to claim 1, characterised in that the frame-like/plate-like elements are formed as struts and are made of plastics material, fibre-reinforced plastics material, glass fibre-reinforced plastics material, metallic material, wood or combinations of the aforementioned materials.

16. Flow energy installation according to claim 1, characterised in that the frame-like/plate-like elements and/or struts have rounded contours in the direction toward a sheath body.

17. Flow energy installation according to claim 1, characterised in that the fluid conducting fin is a sheath body and is made of a membrane-like film, woven fabric, plastics material, metallic material or combinations of the aforementioned materials and has a single-layered or multilayered construction.

18. Flow energy installation according to claim 1, characterised in that the diffuser element is solid in its configuration.

19. Flow energy installation according to claim 1, characterised in that the diffuser element(s) is/are arched in certain regions in such a way that it/they is/are adapted to the course of a circular envelope spanning the outwardly pointing ends of the rotor blades.

20. Flow energy installation according to claim 1, characterised in that an inflow opening (Es) and an outflow opening (As) are formed by two diffuser elements (4, 5) arranged at opposing longitudinal sides of the rotor.

21. Flow energy installation according to claim 1, characterised in that the diffuser element(s) are configured so as to be airfoil-like in cross section.

22. Flow energy installation according to claim 1, characterised in that the diffuser elements (4, 5) extend between a first closure plate and a second closure plate (6).

23. Flow energy installation according to claim 1, characterised in that the first closure plate and/or the second closure plate is/are outwardly arched.

24. Flow energy installation according to claim 1, characterised in that at least one rotor is rotatably arranged between the first closure plate and the second closure plate.

25. Flow energy installation according to claim 1, characterised in that between the first closure plate and the second closure plate two or more rotors are arranged next to one another and/or one above another in the direction of flow.

26. Flow energy installation according to claim 1, characterised in that the rotor has at least two outer rotor plates between which the rotor blades extend.

27. Flow energy installation according to claim 1, characterised in that at least a third rotor plate, stabilising the rotor blades, is arranged between the two outer rotor plates.

28. Flow energy installation according to claim 1, characterised in that the rotor has rotor blades arranged one above another/next to one another.

29. Flow energy installation according to claim 1, characterised in that the rotor blades, arranged one above another/next to one another, of the rotor are aligned with one another or are arranged offset from one another in the circumferential direction.

30. Flow energy installation according to claim 1, characterised in that the outer contour of the sheath body of the diffuser element or the outer contour of the solid diffuser element (4, 5) have in the direction of approach flow of the wind (W) edges (4.1,5.1) which form an inflow opening (ES) and in the direction of away flow edges (4.2, 5.2) which form an outflow opening (AS) which respectively extend up to before and after the rotor (1).

31. Flow energy installation according to claim 1, characterised in that starting from the direction of approach flow of the wind (W), the distance between the mutually facing surfaces of the sheath body of the diffuser elements) (4, 5) tapers, is subsequently adapted to the course/diameter of the rotor (1) and widens after the rotor (1).

32. Flow energy installation according to claims 1, characterised in that the outwardly pointing surfaces (4a, 5a) of the sheath body of the diffuser elements (4, 5) form mirror images of each other.

33. Flow energy installation according to claim 1, characterised in that the surface (4c) of the sheath body of the diffuser element (4) running from the edge (4.1) to the rotor (1) has a concave-convex curvature.

34. Flow energy installation according to claim 1, characterised in that the convex curvature of a rotor blade (2) points in the direction of rotation.

35. Flow energy installation according to claim 1, characterised in that the convex curvature of an air conducting fin (3) points in the direction of rotation.

36. Flow energy installation according to claim 1, characterised in that the energy provided thereby can be used via a generator to generate power.

37. Flow energy installation according to claim 1, characterised in that the installation can be used to charge a battery.

38. Flow energy installation according to claim 1, characterised in that the rotation thereof can be used to produce warm water.

39. Flow energy installation according to claim 1, characterised in that the installation can be pivoted in any desired direction.

40. Flow energy installation according to claim 1, characterised in that the installation can be used as a wind power installation with a vertically or horizontally oriented first axis (A1) of the rotor.

41. Flow energy installation according to claim 1, characterised in that the installation has a wind vane for automatic orientation in accordance with the wind direction.

42. Flow energy installation according to claim 1, characterised in that the wind vane sits on the upper closure plate and protrudes radially beyond the wind power installation in the direction of the outflow opening.

43. Flow energy installation according to claim 1, characterised in that there extend from the upper closure plate 8.1 and from the lower closure plate 8.2 to the first and to the second diffuser element ESH baffle plates L which have a bevel of approx. 45° and by means of which turbulences are avoided or reduced.

44. Flow energy installation according to claim 1, characterised in that the installation can be used as a turbine in liquid media (rivers, dams) with a vertically or horizontally oriented first axis (A1) of the rotor.

45. Flow energy installation according to claim 1, characterised in that on use in liquid flowing media, in particular rivers, the installation is fastened in a floating manner with a horizontally oriented axis (A1), so that the installation operates independently of the water level.

46. Flow energy installation according to claim 1, characterised in that on use in liquid flowing media, in particular rivers, the installation is fastened in the floor region of the waterway with a vertical axis (A1), so that the installation operates independently of the water level.

47. Flow energy installation according to claim 1, characterised in that the installation can be used in land, air and water vehicles, depending on the field of use, in conjunction with corresponding power take-offs and converters to generate energy from the wind or head wind and/or from flowing liquid media.

48. Flow energy installation according to claim 47, characterised in that the installation can be operated in combination with hydraulic and/or pneumatic and/or electrical systems in a manner of a hybrid system.

49. Flow energy installation according to claim 1, wherein the length of the air conditioning fin (3) is smaller than the length of the rotor blade (2).

50. Flow energy installation with at least one in particular roller-like rotor (1) which rotates about an axis (A1) and has a plurality of rotor blades (2), wherein one, a plurality or all rotor blades (2) have associated with them at least one efficiency-improving fluid conducting fin (3) which in the direction of rotation is arranged upstream or downstream of the rotor blade (2) and the rotor is at least partly surrounded by at least one efficiency-improving diffuser element, and wherein the flow energy installation can be operated with fluid media at any desired orientation of the axis (A1), wherein gaps present in a basic element are filled by a frame-like construction.

51. Flow energy installation with at least one in particular roller-like rotor (1) which rotates about an axis (A1) and has a plurality of rotor blades (2), wherein one, a plurality or all rotor blades (2) have associated with them at least one efficiency-improving fluid conducting fin (3) which in the direction of rotation is arranged upstream or downstream of the rotor blade (2) and the rotor is at least partly surrounded by at least one efficiency-improving diffuser element, and wherein the flow energy installation can be operated with fluid media at any desired orientation of the axis (A1), wherein gaps present in a basic element are filled with foam, structural foam, rigid foam, granular or flocculent material.

* * * * *